(12) United States Patent
Nault

(10) Patent No.: US 6,428,215 B1
(45) Date of Patent: Aug. 6, 2002

(54) TUNABLE FIBER OPTIC CONNECTOR AND METHOD FOR ASSEMBLING

(75) Inventor: Patrick Jude Nault, Carver, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 09/749,223

(22) Filed: Dec. 27, 2000

(51) Int. Cl.[7] .................................................. G02B 6/36
(52) U.S. Cl. ............................................ 385/78; 385/88
(58) Field of Search ............................ 385/78, 88, 147, 385/60, 75, 80

(56) References Cited

U.S. PATENT DOCUMENTS

| | | | |
|---|---|---|---|
| 4,690,494 A | 9/1987 | Hirose et al. | 385/60 |
| 4,726,647 A | 2/1988 | Kakii et al. | 385/60 |
| 4,762,389 A | 8/1988 | Kaihara | 385/60 |
| 4,792,205 A | 12/1988 | Yin et al. | 385/80 |
| 5,016,970 A | 5/1991 | Nagase et al. | 385/60 |
| 5,134,677 A | 7/1992 | Leung et al. | 385/84 |
| 5,142,598 A | 8/1992 | Tabone | 385/78 |
| 5,146,525 A | 9/1992 | Tabone | 385/78 |
| 5,212,752 A | 5/1993 | Stephenson et al. | 385/78 |
| 5,212,753 A | 5/1993 | Maranto | 385/80 |
| 5,214,732 A | 5/1993 | Beard et al. | 385/78 |
| 5,216,733 A | 6/1993 | Nagase et al. | 385/60 |
| 5,222,169 A | 6/1993 | Chang et al. | 385/87 |
| 5,224,186 A | 6/1993 | Kishimoto et al. | 385/78 |
| 5,253,315 A | 10/1993 | Fentress | 385/78 |
| 5,287,425 A | 2/1994 | Chang | 385/81 |
| 5,321,784 A | 6/1994 | Cubukciyan et al. | 385/78 |
| 5,428,703 A | 6/1995 | Lee | 385/78 |
| 5,436,995 A | 7/1995 | Yoshizawa et al. | 385/86 |
| 5,625,731 A | 4/1997 | Turgeon et al. | 385/53 |
| 5,633,970 A | 5/1997 | Olson et al. | 385/78 |
| 5,682,451 A | 10/1997 | Lee et al. | 385/78 |
| 5,717,802 A | 2/1998 | Briggs et al. | 385/75 |
| 5,809,192 A | 9/1998 | Manning et al. | 385/78 |
| 5,852,694 A | 12/1998 | Kimura et al. | 385/78 |
| 5,946,436 A | 8/1999 | Takashi | 385/60 |
| RE37,079 E | 3/2001 | Stephenson et al. | 385/78 |
| RE37,080 E | 3/2001 | Stephenson et al. | 385/78 |

*Primary Examiner*—Tulsidas Patel
(74) *Attorney, Agent, or Firm*—Merchant & Gould P.C.

(57) ABSTRACT

A tunable connector and method for assembling a tunable connector. The connector includes a ferrule that is retainably engaged within a hub. The connector further includes a rear housing and a front housing. The rear housing is sized to receive and rotationally retain the hub. The front housing has a bore that receives and engages the exterior surface of the rear housing. The front and rear housing include engagement members that allow the rear housing to be retained within the front housing and rotated relative to the front housing between discrete positions.

39 Claims, 5 Drawing Sheets

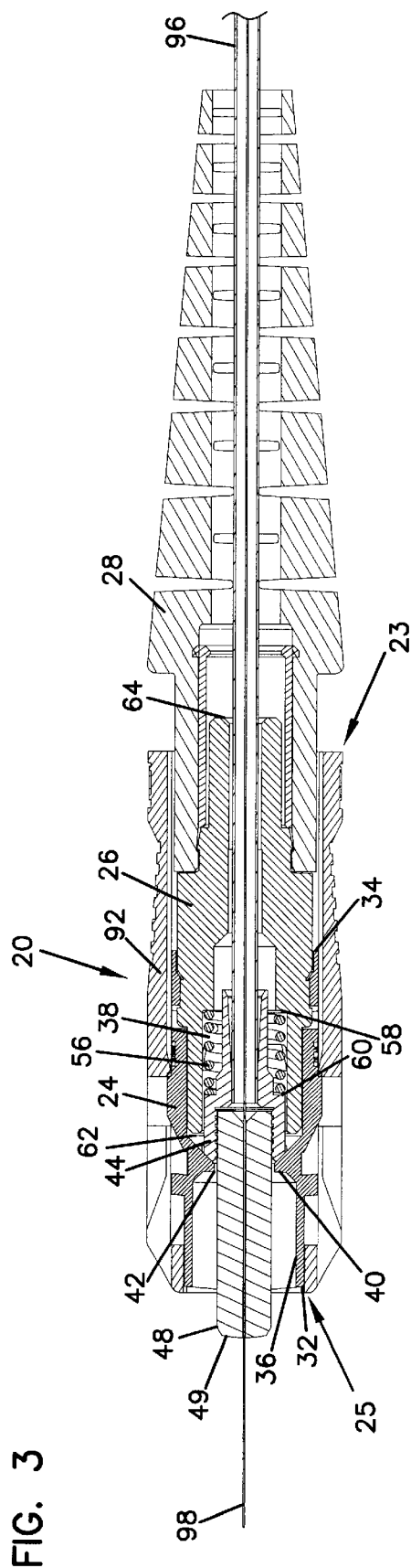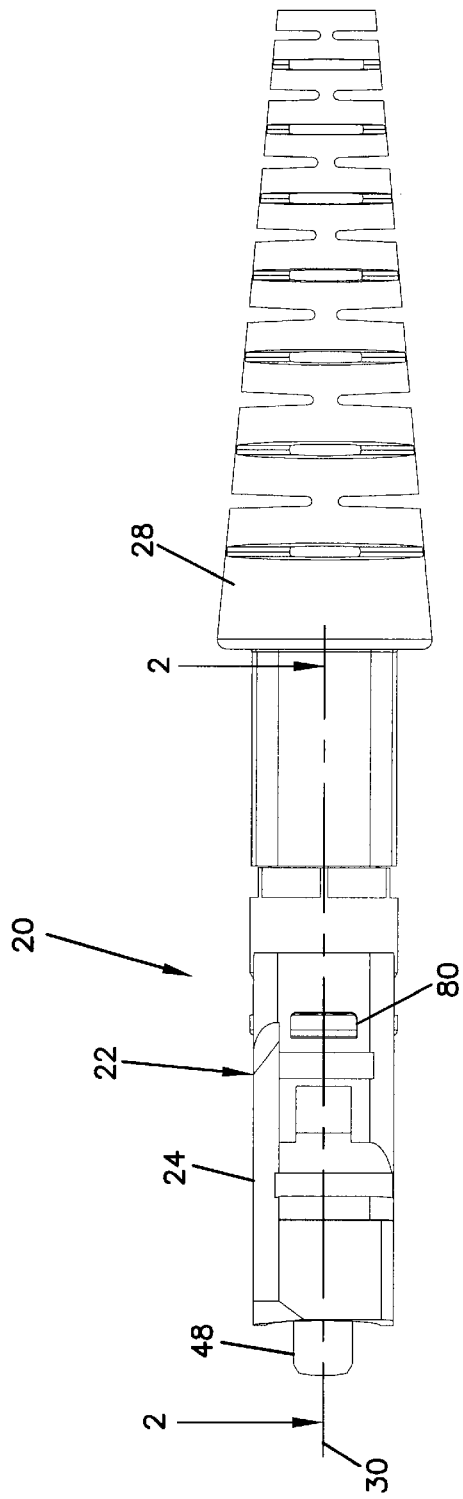

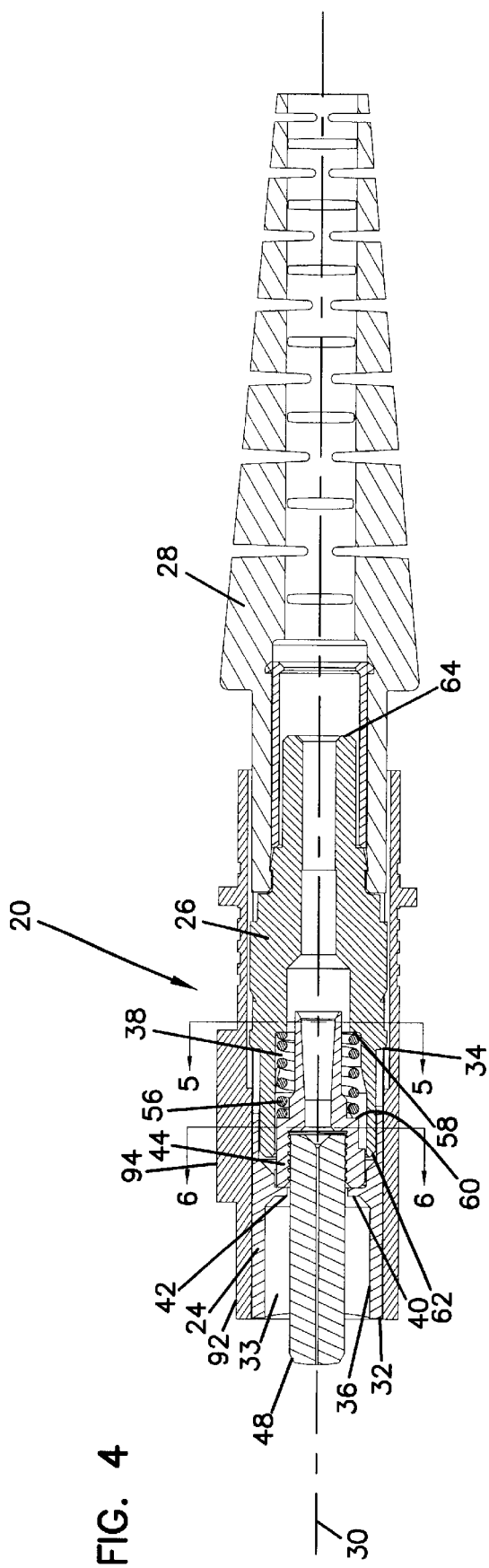

TUNABLE FIBER OPTIC CONNECTOR AND METHOD FOR ASSEMBLING

FIELD OF THE INVENTION

The present invention relates to tunable fiber optic connectors for use in optical fiber signal transmission systems, and to methods for assembling such fiber optic connectors.

BACKGROUND OF THE INVENTION

Fiber optic cables are used in the telecommunication industry to transmit light signals in high speed data and communication systems. A standard fiber optic cable includes a fiber with an inner light transmitting optical core. Surrounding the fiber typically is a reinforcing layer and an outer protective casing.

A fiber terminates at a fiber optic connector. Connectors are frequently used to non-permanently connect and disconnect optical elements in a fiber optic transmission system. There are many different fiber optic connector types. Some of the more common connectors are FC and SC connectors. Other types of connectors include ST and D4-type connectors.

A typical SC fiber optic connector includes a housing having a front end positioned opposite from a rear end. The front end of the SC connector housing is commonly configured to be inserted within an adapter. An example adapter is shown in U.S. Pat. No. 5,317,663, the disclosure of which is incorporated by reference. The SC connector typically further includes a ferrule that is positioned within the front and rear ends of the housing, and adjacent the front end. The ferrule is axially moveable relative to the housing, and is spring biased toward the front of the connector. The fiber optic cable has an end that is stripped. The stripped end includes a bare fiber that extends into the connector and through the ferrule.

A connector, such as the connector described above, is mated to another connector within an adapter like the adapter of U.S. Pat. No. 5,317,663. A first connector is received within the front portion of the adapter, and a second fiber is received within the rear portion of the adapter. When two connectors are fully received within an adapter, the ferrules (and hence the fibers internal to the ferrule) contact or are in close proximity to each other to provide for signal transmission between the fibers.

Signal losses within a system often occur within the connection between two optical fiber cores. Due to manufacturing tolerances of the ferrule outer diameter to inner diameter concentricity, ferrule inner diameter hole size and fiber outer diameter, and fiber core to fiber outer diameter concentricity, when the fiber is inserted into the ferrule the core of a fiber may not and typically does not end up perfectly centered relative to the ferrule outer diameter. If one or both of the fibers are off center, when they are connected within an adapter, the fibers will not be aligned and thus there will be a signal loss when the signal is transmitted between the two fibers. It is therefore desirable to have a tunable connector that can provide for optimal alignment with another connector so as to minimize signal loss.

SUMMARY OF THE INVENTION

One aspect of the present invention relates to a fiber optic connector. The connector includes a ferrule that is retainably engaged within a hub. The connector further includes a rear housing and a front housing. The rear housing is sized to receive and rotationally retain the hub. The front housing has a bore that receives and engages the exterior surface of the rear housing. The front and rear housing include engagement members that allow the rear housing to be retained within the front housing and rotated relative to the front housing between discrete positions.

Another aspect of the present invention relates to a method for assembling a fiber optic connector. The method includes providing a ferrule retainably engaging a hub. This assembly is then positioned within the bore of a rear housing with the hub rotationally retained within the bore. Next, the rear housing is inserted into the bore of a front housing, and the rear housing is then rotated within the front housing between discrete positions.

A variety of advantages of the invention will be set forth in part in the description that follows, and in part will be apparent from the description, or may be learned by practicing the invention. It is to be understood that both the foregoing general description and the following detailed description are explanatory only and are not restrictive of the invention as claimed.

BRIEF DESCRIPTION OF THE DRAWINGS

The accompanying drawings, which are incorporated in and constitute a part of the specification, illustrate several aspects of the invention and together with the description, serve to explain the principles of the invention. A brief description of the drawings is as follows:

FIG. 1 is a side view of an SC-type connector constructed in accordance with the principles of the present invention without the grip;

FIG. 3 is a cross-sectional side view of the connector of FIG. 1 fully assembled including the grip mounted over the front of the connector and a fiber optic cable attached to the connector;

FIG. 4 is a cross-sectional side view of the fully assembled connector shown in FIG. 3 rotated 90 degrees to a second orientation about the longitudinal axis;

DETAILED DESCRIPTION

Figure 8:
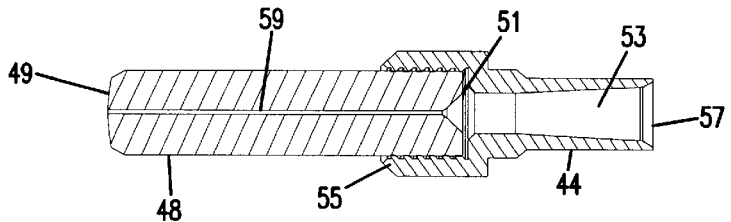
FIG. 8 is a cross-sectional side view of the hub with connected ferrule used in the SC-type connector of the present invention.

Reference will now be made in detail to exemplary aspects of the present invention that are illustrated in the accompanying drawings. Where ever possible, the same reference numbers will be used throughout the drawings to refer to the same or like parts.

FIG. 1 illustrates an SC-type connector 20 constructed in accordance with the principles of the present invention. The connector 20 includes a housing 22 having a front housing 24 that connects to a rear housing 26. A boot 28 is mounted at the rear end 23 of the connector 20. The front portion 49 of a ferrule 48 is shown extending out the front end 25 of the connector 20. The ferrule 48 is mounted to a hub 44 (not shown in FIG. 1) which together are slidably mounted within the connector 20. As shown, the rear housing 26 is a unitary piece. However, it could alternatively be a constructed of more than one piece such as the two-piece construction shown and described in pending application Ser. No. 09/459,968, filed Dec. 13, 1999, the disclosure of which is expressly incorporated by reference herein.

For clarity, no fiber optic cable is shown in FIG. 1. Also for clarity, FIG. 1 does not include the slidable outer grip located at the front of the housing that is typically found on an SC-type connector. However, the grip and the cable are shown on other figures and will be described later in the specification in connection with the description of those other figures.

Figure 2:
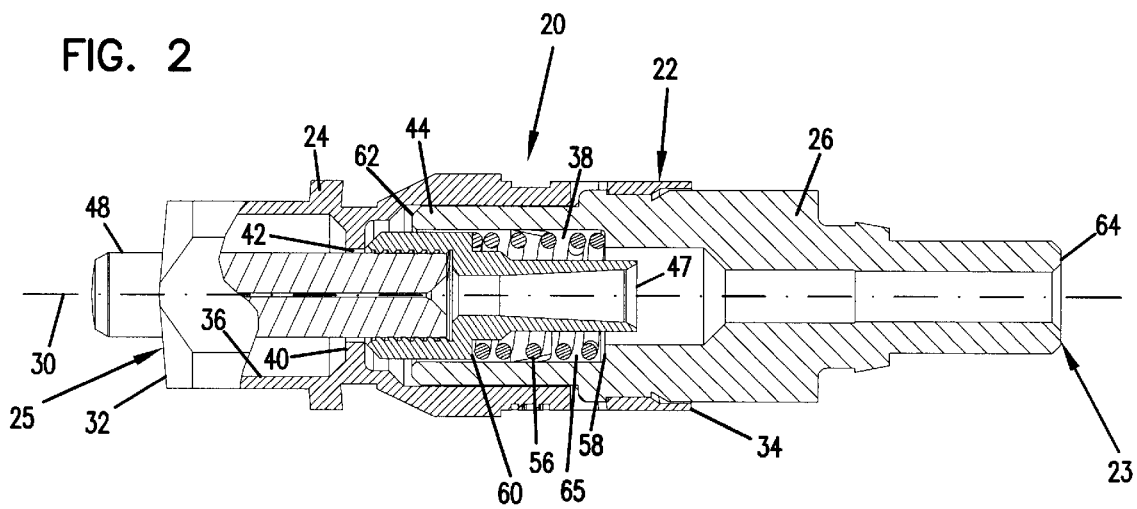
FIG. 2 is a partial cross-sectional side view taken longitudinally through the connector of FIG. 1 between line 2—2 without the boot.

Referring to FIG. 2, the front housing 24 of the connector 20 extends along a longitudinal axis 30 and includes a front end 32 positioned opposite from a rear end 34. The front housing 24 also defines a front chamber 36 and a rear chamber 38. A transverse wall 40 separates the front and rear chambers 36 and 38. An opening 42 centered about the longitudinal axis 30 is defined by the transverse wall 40. The front and rear ends 32 and 34 of the front housing piece 24 are open with a bore 33 (see FIG. 4) formed therebetween extending along longitudinal axis 30.

The connector 20 also includes a hub 44 positioned within the connector 20. The hub 44 is mounted to slide longitudinally along the axis 30 relative to the front housing piece 24. The hub 44 has openings 45 and 47 at its front and rear portions 55 and 57 with a bore 53 extending between the openings.

The hub 44 secures a ferrule 48. The ferrule 48 includes a rear portion 51 mounted within the front opening 45 defined by the hub 44. The ferrule 48 may be secured to the hub 44 using a conventional fastening technique, such as an epoxy adhesive. The hub 44 can also be mounted to the ferrule 48 with an interference fit or it can be molded around the ferrule 48. The ferrule 48 includes a bore 59 for receiving a bare optical fiber. The ferrule 48 extends along the longitudinal axis 30 from the hub 44 toward the front end 32 of the front housing piece 24. The ferrule 48 extends through the central opening 42 of the transverse wall 40 between the front and rear chambers 36 and 38 of the front housing piece 24, and protrudes out from the front end 23 of the connector 20.

The connector 20 further includes a coil spring 56 positioned within the rear chamber 38. The coil spring 56 surrounds the rear portion 57 of the hub 44 and is captured between a forwardly facing shoulder 58 formed by the rear housing piece 26 and a rearwardly facing shoulder 60 formed by the hub 44. The spring 56 functions to bias the hub 44 toward the front end 32 of the front housing piece 24. Because the ferrule 48 is connected to the hub 44, the spring 56 also functions to bias the ferrule 48 in a forward direction.

The rear housing 26 also extends along longitudinal axis 30 and includes a front end 62 positioned opposite from a rear end 64. The hub 44 and surrounding spring 56 slide into the opening 27 at the front end 62 of the rear housing 26. The hub 44 and spring 56, however, are not mechanically fastened to the rear housing 26, and thus are free to move longitudinally along axis 30 with respect to the rear housing 26. The only limit placed on the rearward movement of the hub 44 and spring 56 into the rear housing 26 is the forward facing shoulder 58 on the rear housing 26 which, as mentioned above, engages the spring 56. The engagement of the spring 56 to the shoulder 58 functions to bias the hub 44 and connected ferrule 48 outward from the opening 27 at the front end 62 of the rear housing 26.

Figure 7:
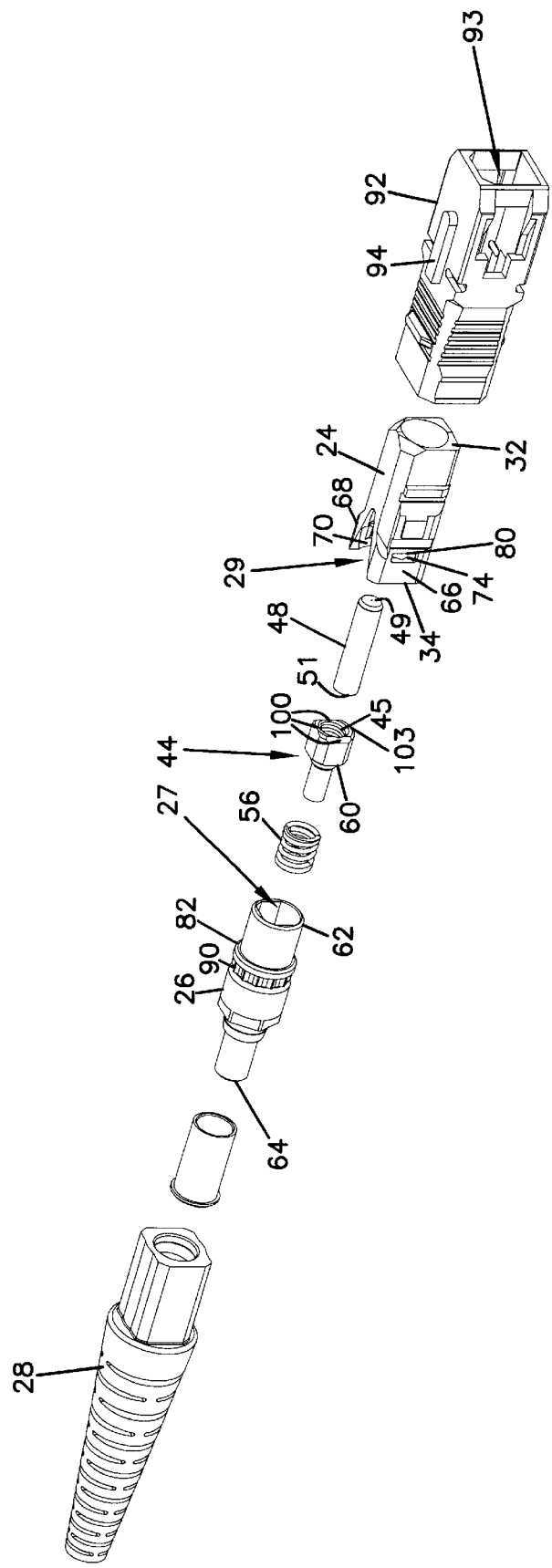
FIG. 7 is an exploded perspective view of the SC-type connector of the present invention.

The front portion 55 of the hub 44 and the opening 27 at the front end 62 of the rear housing 26 are sized so that the hub 44, when received within the rear housing 26, cannot be rotated within the rear housing 26. Likewise, the ferrule 48, which is secured to the hub 44, does not rotate relative to the rear housing 26 when the hub 44 is fully inserted therein. This can be achieved by having a non-circularly shaped hub 44 and a corresponding non-circularly shaped opening 27 at the front end 62 of the rear housing 26. In the embodiment shown, the hub 44 and the opening 27 to the rear housing 26 have the same non-noncircular shape so that the hub 44 can only be received within the opening 27 in one orientation. As shown in FIG. 7, the outer circumference of the hub 44 and opening in the rear housing 26 are each defined by three planar sides 100 and an arched side 103. This configuration permits the hub 44 to be received within the rear housing 26 in only one orientation, and once received within the opening, the hub 44 (and ferrule 48) is not rotatable relative to the rear housing 26. It can be appreciated that other configurations could be used which allow the hub 44 to be inserted into the rear housing 26 in multiple orientations but not be rotatable once the hub 44 is received within the rear housing 26.

Figure 9:
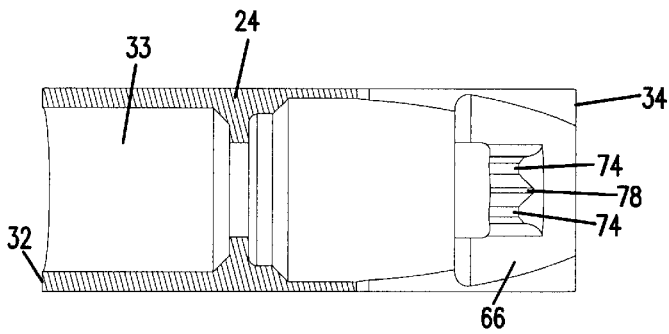
FIG. 9 is a cross-sectional side view of the front housing piece of the SC-type connector of the present invention.

Further details of the front housing 24 can be seen in FIGS. 7 and 9. The rear portion 34 of the front housing 24 includes two extensions 66 and 68 that define the opening 29 at the rear portion 34. The extensions 66 and 68 also define two tapered cut-outs 70 that extend longitudinally toward the front end 32 of the front housing 24 on two of the sides of the front housing 24 (see FIG. 7 showing one of the tapered cut-outs 70 on the top-facing side of the front housing 24). The cut-outs 70 give the extensions 66 and 68 a resiliency allowing them to be deflected outward when suitable pressure is applied from within the opening 29. On the inside of each of the resilient extensions 66 and 68 proximate the opening 29 at the rear end 34 are a pair of projections, or teeth 74 and 76, extending into the bore 33 of the front housing 24 (see FIG. 5). Each of the pairs of teeth 74 and 76 defines a recess 78 therebetween. Adjacent the pairs of teeth 74 and 76 are slots 80 formed within the resilient extensions 66 and 68.

Figure 10:
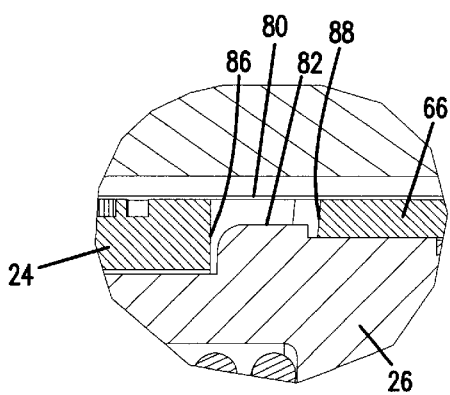
FIG. 10 is an enlarged cross-sectional side view showing a portion of the collar on the rear housing piece of the SC-type connector engaging one of the slots in the front housing piece.

As noted above, the front housing 24 connects to the rear housing 26. The front end 62 of rear housing 26 is received into the opening 29 at the rear end 34 of the front housing 24. A collar 82 extends around the external surface of the rear housing 26. When the rear housing 26 is inserted into the opening 29 of the front housing 24, the collar 82 presses up against the pairs of teeth 74 and 76 that project into the bore 33 of the front housing 24, inhibiting further insertion of the rear housing 26 into the front housing 24. However, when added longitudinal pressure is applied by the rear housing 26 against the front housing 24, the resilient extensions 66 and 68 are deflected outward which increases the opening 29 slightly to allow the collar 82 to pass over the pairs of teeth 74 and 76. Immediately after passing over the two pairs of teeth 74 and 76, the collar 82 snaps into the adjacent slots 80 formed in the front housing 24. When that occurs, the resilient extensions 66 and 68 quickly return to their natural positions, which secures the rear housing 26 to the front housing 24. FIG. 10 shows a cross-sectional view of the collar 82 retained within one of the slots 80. Forward and backward facing shoulders 86 and 88 on the front housing 24, which define the slot 80, prevent longitudinal movement of the mounted rear housing 26 relative to the front housing 24 when the collar 82 is positioned within the slots 80.

Figure 5:
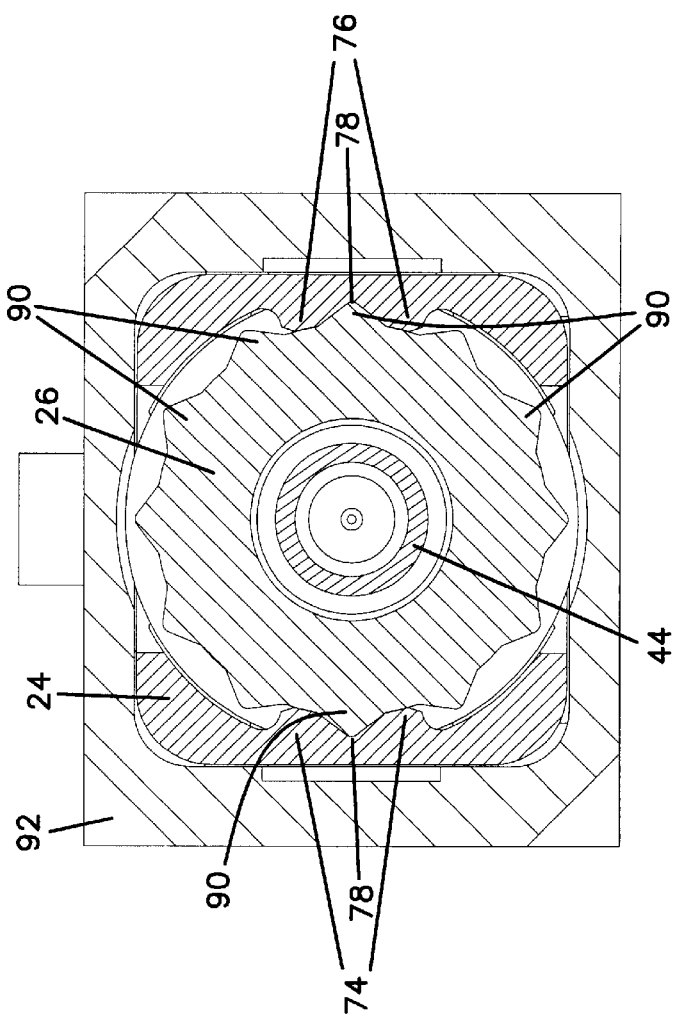
FIG. 5 is a cross-sectional end view taken along line 5—5 in FIG. 4.

The front and rear housings 24 and 26 further include structure that inhibits rotational movement of the rear housing 26 when it is snapped into the front housing 24. Adjacent the collar 82 on the rear housing 26 is a ring of projections, or teeth 90, that extend outward around the circumference of the rear housing 26. The exemplary embodiment shown includes twelve evenly spaced teeth 90 formed around the circumference of the rear housing 26. These projections 90 are seen most clearly in FIGS. 5 and 7. When the collar 82 snaps into the slots 80 on the front housing 24, as described above, the ring of teeth 90 on the external surface of the rear housing 26 at the same time engages and is aligned with the pairs of internally projecting teeth 74 and 76 within the bore 33 of the front housing 24. Each of the teeth 90 on the rear housing 26 are sized to be received within the recesses 78 formed between the pairs of teeth 74 and 76. As such when the rear housing 26 is snapped into the front housing 24, two of the teeth 90 on directly opposite sides are forced into the recesses 78 formed on the opposing resilient extensions 66 and 68 of the front housing 24. This engagement is shown in FIG. 5. With this arrangement, the rear housing 26 is not freely rotatable within the front housing 24, but is held at a discrete position. However, if the rear housing 26 is twisted relative to the front housing 24 with sufficient rotational pressure, the resilient extensions 66 and 68 will deflect outward slightly, allowing the rear housing 26 to be rotated within the front housing 24 to a second position with a new set of opposing teeth 90 on the rear housing 26 engaging the recesses 78. Because there are twelve different teeth 90 on the rear housing 26 in the exemplary embodiment, there are twelve different discrete rotational positions that can be selected when rotationally positioning the rear housing 26 within the front housing 24. It is understood that the number and configuration of the projections on the front and rear housings 24 and 26 could be altered without departing from the scope of the present invention. Other structure for providing the selection of discrete rotational positions of the inserted rear housing 26 with respect to the front housing 24 could also be used that are consistent with the teachings of this invention.

The connector 20 further includes a grip 92. The connector housing 22 inserts into a bore 93 formed within the grip 92. The front housing 24 includes structure that mounts the connector housing 22 within the grip 92. When the connector housing 22 is positioned within the grip 92, the grip 92 restrains the resilient extensions 66 and 68, preventing them from deflecting outward. As such, rotational alignment between the front and rear housings 24 and 26, via the interlocking teeth on the housings, cannot be further altered once the grip 92 is positioned over the connector housing 22. The external surface of the connector housing 22 and the bore 93 of the grip 92 are configured such that the connector housing 22 can be fully inserted into the grip 92 in only one orientation. Alternatively, the connector housing 22 could include other types of external keys. The external surface of the grip 92 includes a key 94 (seen in FIGS. 4 and 7) that is sized to be received into a slot of an adaptor (not shown), such as the adapter of U.S. Pat. No. 5,317,663, where the connector mates with a second SC-type connector. As described in the method of assembly below, with this configuration, prior to locking the rotational orientation of the connector housing 22, the connector 20 can be tuned and the front and rear housings 24 and 26 rotated relative to one another to align with a key on the connector housing 22.

The present invention is further directed to a method for assembling the SC-type connector described above. The ferrule 48 is first mounted within the opening 45 formed in the front portion 55 of the hub 44. A cross-sectional side viewing of this arrangement is shown in FIG. 8. The spring 56 is then positioned over the rear portion 57 of the hub 44, and together these are inserted into the front end 62 of the rear housing 26. As mentioned above, the front portion 55 of the hub 44 is sized so that when it is inserted into the rear housing 26 the hub 44 (and connected ferrule 48) cannot rotate relative to the rear housing 26.

Next, the rear housing 26 is snapped into the front housing 24, thereby retaining the hub 44 and ferrule 48 (and spring 56) within the connected housing 22. This connection is made to prevent longitudinal movement of the rear housing 26 relative to the front housing 24. However, the engagement does not prevent rotational movement between the two housings 24 and 26.

At this point, a fiber optic cable 96, having a central fiber 98, is attached to the connector 20 using conventional techniques well known in the art. This includes stripping the end of the cable 96 to expose the fiber 98. The fiber 98 is then fed into the connector 20 all the way through the bore 59 in the ferrule 48. The fiber may be either mechanically or adhesively retained within the ferrule 48. A reinforcement layer of the fiber optic cable 96 is crimped with a crimp sleeve 71. The boot 28 is positioned over the crimp 71 and helps provide strain relief. The exposed bare fiber at the front end 49 of the ferrule 48 may then be polished.

Figure 6:
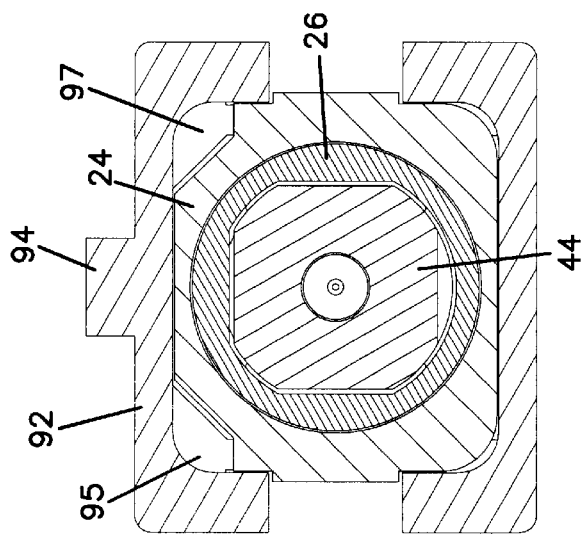
FIG. 6 is a further cross-sectional end view taken along line 6—6 in FIG. 4.

The connector 20 is then tuned. This includes measuring the eccentricity with appropriate test equipment to identify, for example, any offset of the optical core within the fiber 98 or offset of the fiber 98 within the ferrule 48. After determining the direction of any such offset, the rear housing 26 is rotated within the front housing 24 to one of the selectable discrete positions. Those positions are defined by the rotational positions of the projections 90 on the external surface of the rear housing 26 that engage a corresponding alignment feature, such as a recess 78 between a pair of projections (e.g., pairs of teeth 74 and 76), on the internal surface of the front housing 24. A position is selected that will minimize signal loss when the connector 20 is mated with another connector within an adaptor. As mentioned, the front housing 24 has a shape that permits insertion of it into a grip 92 in only one orientation. As shown in FIG. 6, the grip 92 includes tabs 95 and 97 that block access of the connector housing 22 into the grip 92 if the housing 22 is improperly orientated. Thus, the discrete position is selected to align with the orientation in which the connector 20 is to be inserted within the grip 92. In this way, the configuration of the housing serves as a key to which the selectable discrete position is aligned. Other alternative keys could be included on the housing to align with the selectable discrete position.

Finally, once the proper rotational position is selected, connector 20 is inserted within a grip 92. The grip 92 prevents the extensions 66 and 68 from deflecting outward, and thus rotationally locks the rear housing 26 to the front housing 24 at the previously-selected discrete position. The connector 20 can then be inserted into an adaptor (not shown) for mating with a second SC-type connector.

With regard to the foregoing description, it is to be understood that changes may be made in detail, especially in matters of the construction materials employed and the shape, size and arrangement of the parts without departing from the scope of the present invention. It is intended that the specification and depicted aspects be considered exemplary only, with a true scope and spirit of the invention being indicated by the broad meaning of the following claims.

What is claimed is as follows:

1. A fiber optic connector comprising:
   a ferrule;
   a hub retainably engaging the ferrule;
   a rear housing having an external surface and a bore for receiving the hub, the rear housing rotationally retaining the hub;
   a front housing having a bore with an internal surface for receiving and engaging the external surface of the rear housing; and
   an engagement member on each of the front and rear housings, wherein the rear housing is rotatable within the front housing between selectable discrete positions defined by the engagement members.

2. The connector of claim 1, wherein the connector is an SC-type connector.

3. The connector of claim 1, wherein the bore of the rear housing has a noncircular configuration, and the hub has an external surface with a corresponding noncircular configuration.

4. The connector of claim 3, wherein the hub inserts into the rear housing in only one orientation.

5. The connector of claim 1, wherein the rear housing includes a plurality of engagement members extending around a circumference of the external surface of the rear housing, and the internal surface of the front housing further includes a corresponding engagement member, wherein rotation of the rear housing within the bore of the front housing sequentially engages each of the plurality of engagement members with the corresponding engagement member, each sequential engagement defining a selectable discrete position.

6. The connector of claim 1, wherein the engagement member on the rear housing includes a plurality of teeth extending from the external surface around a circumference of the rear housing, and wherein the engagement member on the front housing includes a recess, the recess defined by a first tooth and a second tooth extending from the internal surface of the front housing into the bore of the front housing, wherein rotation of the rear housing within the front housing sequentially engages each of the plurality of teeth within the recess, the engagement of each of the plurality of teeth within the recess defining a selectable discrete position.

7. The connector of claim 6, wherein the engagement member on the front housing further includes a second recess defined by a third tooth and a fourth tooth extending from the internal surface of the front housing into the bore of the front housing, the second recess engaging one of the plurality of teeth at each of the selectable discrete positions.

8. The connector of claim 1, wherein the front housing has a key element, and wherein the connector further includes a grip with a corresponding key element mating with the front housing key element.

9. The connector of claim 8, wherein the rear housing includes a plurality of engagement members extending around a circumference of the external surface of the rear housing, and the internal surface of the front housing further includes a corresponding engagement member, wherein rotation of the rear housing within the bore of the front housing sequentially engages each of the plurality of engagement members with the corresponding engagement member, each sequential engagement defining a selectable discrete position.

10. The connector of claim 8, wherein the engagement member on the rear housing includes a plurality of teeth extending from the external surface around a circumference of the rear housing, and wherein the engagement member on the front housing includes a recess, the recess defined by a first tooth and a second tooth extending from the internal surface of the front housing into the bore of the front housing, wherein rotation of the rear housing within the front housing sequentially engages each of the plurality of teeth within the recess, the engagement of each of the plurality of teeth within the recess defining a selectable discrete position.

11. The connector of claim 10, wherein the engagement member on the front housing further includes a second recess defined by a third tooth and a fourth tooth extending from the internal surface of the front housing into the bore of the front housing, the second recess engaging one of the plurality of teeth at each of the selectable discrete positions.

12. The connector of claim 1, further including a grip engaging the front housing, the grip locking the front housing to the rear housing at one of the selectable discrete positions.

13. The connector of claim 12, wherein the rear housing includes a plurality of engagement members extending around a circumference of the external surface of the rear housing, and the internal surface of the front housing further includes a corresponding engagement member, wherein rotation of the rear housing within the bore of the front housing sequentially engages each of the plurality of engagement members with the corresponding engagement member, each sequential engagement defining a selectable discrete position.

14. The connector of claim 12, wherein the engagement member on the rear housing includes a plurality of teeth extending from the external surface around a circumference of the rear housing, and wherein the engagement member on the front housing includes a recess, the recess defined by a first tooth and a second tooth extending from the internal surface of the front housing into the bore of the front housing, wherein rotation of the rear housing within the front housing sequentially engages each of the plurality of teeth within the recess, the engagement of each of the plurality of teeth within the recess defining a selectable discrete position.

15. The connector of claim 14, wherein the engagement member on the front housing further includes a second recess defined by a third tooth and a fourth tooth extending from the internal surface of the front housing into the bore of the front housing, the second recess engaging one of the plurality of teeth at each of the selectable discrete positions.

16. A fiber optic connector comprising:
   a ferrule;
   a hub retainably engaging the ferrule;
   a rear housing having an external surface and a bore for rotationally retaining the hub;
   a front housing having a bore with an internal surface for receiving and engaging the external surface of the rear housing; and
   retention means on each of the front and rear housings for rotationally engaging the front housing to the rear housing at one of selectable discrete positions defined by the retention means.

17. The connector of claim 16, wherein the connector is an SC-type connector.

18. The connector of claim 16, wherein the retention means on the rear housing includes a plurality of teeth extending from the external surface around a circumference of the rear housing, and wherein the retention means on the front housing includes a recess, the recess defined by a first tooth and a second tooth extending from the internal surface of the front housing into the bore of the front housing, wherein rotation of the rear housing within the front housing sequentially engages each of the plurality of teeth within the recess, the engagement of each of the plurality of teeth within the recess defining a selectable discrete position.

19. The connector of claim 18, wherein the retention means on the front housing further includes a second recess defined by a third tooth and a fourth tooth extending from the internal surface of the front housing into the bore of the front housing, the second recess engaging one of the plurality of teeth at each of the selectable discrete positions.

20. A fiber optic connector comprising:
a ferrule having a front end and an opposite rear end;
a hub retainably engaging the ferrule;
an inner housing having a first part and a second part, wherein the hub is rotationally retained by the first part, and the second part is rotatable relative to the first part between selectable discrete positions, the inner housing having a front end and a rear end, the front end of the ferrule positioned adjacent the front end of the inner housing, the hub longitudinally movable relative to the inner housing;
a spring biasing the hub toward the front end of the inner housing; and
an outer housing engageable with the inner housing, wherein the outer housing locks the second part to the first part at one of the selectable discrete positions.

21. The connector of claim 20, wherein each of the first and second parts includes an engagement member, and wherein the selectable discrete positions are defined by engagement between the engagement member on the first part and the engagement member on the second part.

22. The connector of claim 21, wherein the first part includes an external surface and a plurality of engagement members extending around a circumference of the external surface, and the second part includes an internal surface having a corresponding engagement member, wherein the first part is rotatable within the second part, and wherein the rotation of the first part within the second part sequentially engages each of the plurality of engagement members with the corresponding engagement member, each sequential engagement defining a selectable discrete position.

23. The connector of claim 21, the first part further includes an external surface, wherein the engagement member on the first part includes a plurality of teeth extending from the external surface around a circumference of the first part, and wherein the engagement member on the second part includes a recess, the recess defined by a first tooth and a second tooth extending from an internal surface of the second part, wherein the first part is rotatable within the second part, and wherein rotation of the first part within the second part sequentially engages each of the plurality of teeth within the recess, the engagement of each of the plurality of teeth within the recess defining a selectable discrete position.

24. The connector of claim 23, wherein the engagement member on the second part further includes a second recess defined by a third tooth and a fourth tooth extending from the internal surface of the second part, the second recess engaging one of the plurality of teeth at each of the selectable discrete positions.

25. A method of assembling a fiber optic connector, the method comprising the steps of:
providing a ferrule extending from a hub, the hub retainably engaging the ferrule;
positioning the hub within a bore of a rear housing to prevent rotational movement of the hub with respect to the rear housing;
inserting the rear housing into a bore of a front housing; and
rotating the rear housing within the front housing between selectable discrete positions.

26. The method of claim 25, wherein the connector is an SC-type connector.

27. The method of claim 25, further including the step of inserting the front housing within a grip, wherein the grip locks the rear housing to the front housing at one of the selectable discrete positions.

28. The method of claim 25, wherein the rear housing includes an external surface with a plurality of engagement members circumferentially positioned on the external surface, and the front housing includes a bore with a corresponding engagement member, wherein rotating the rear housing within the bore of the front housing sequentially engages each of the plurality of engagement members with the corresponding engagement member, each sequential engagement defining a selectable discrete position.

29. The method of claim 28, wherein the engagement members include a plurality of teeth, and the corresponding engagement member on the front housing is a recess defined by a first tooth and a second tooth, wherein each of the plurality of teeth sequentially engages the recess when the rear housing is rotated within the front housing.

30. The method of claim 25, further including the step of locking the front housing to the rear housing at one of the selectable discrete positions.

31. The method of claim 30, wherein the rear housing includes an external surface with a plurality of engagement members circumferentially positioned on the external surface, and the front housing includes a bore with a corresponding engagement member, wherein rotating the rear housing within the bore of the front housing sequentially engages each of the plurality of engagement members with the corresponding engagement member, each sequential engagement defining a selectable discrete position.

32. The method of claim 31, wherein the engagement members include a plurality of teeth, and the corresponding engagement member on the front housing is a recess defined by a first tooth and a second tooth, wherein each of the plurality of teeth sequentially engages the recess when the rear housing is rotated within the front housing.

33. A fiber optic device comprising:
a connector having a hub retainably engaging a ferrule, a rear housing rotationally retaining the hub, a front housing having a bore for receiving and engaging the rear housing, and an engagement mechanism between the front and rear housing matable in a plurality of selectable discrete positions, wherein the rear housing is rotatable within the bore of the front housing between the selectable discrete positions; and
a fiber optic cable connected to the connector, the cable including a fiber extending through the connector.

34. The device of claim 33, wherein the connector is an SC-type connector.

35. The device of claim 33, wherein the rear housing has an external surface and a plurality of engagement members extending around a circumference of the external surface, and the front housing has an internal surface including a corresponding engagement member, wherein rotation of the rear housing within the bore of the front housing sequentially engages each of the plurality of engagement members with the corresponding engagement feature, each sequential engagement defining a selectable discrete position.

36. The device of claim 35, wherein the plurality of engagement members on the rear housing are teeth, and the corresponding engagement member is a recess defined by a first tooth and a second tooth, wherein rotation of the rear housing within the front housing sequentially engages each of the plurality of teeth within the recess, each engagement defining one of the selectable discrete positions.

37. The device of claim 33, further including a grip engaging the front housing, the grip locking the front housing to the rear housing at one of the selectable discrete positions.

38. The device of claim 37, wherein the rear housing has an external surface and a plurality of engagement members extending around a circumference of the external surface, and the front housing has an internal surface including a corresponding engagement member, wherein rotation of the rear housing within the bore of the front housing sequentially engages each of the plurality of engagement members with the corresponding engagement feature, each sequential engagement defining a selectable discrete position.

39. The device of claim 38, wherein the plurality of engagement members on the rear housing are teeth, and the corresponding engagement member is a recess defined by a first tooth and a second tooth, wherein rotation of the rear housing within the front housing sequentially engages each of the plurality of teeth within the recess, each engagement defining one of the selectable discrete positions.

* * * * *